(12) United States Patent
Welton et al.

(10) Patent No.: US 7,939,471 B2
(45) Date of Patent: May 10, 2011

(54) SUBTERRANEAN TREATMENT FLUIDS COMPRISING VISCOELASTIC SURFACTANT GELS

(75) Inventors: Thomas D. Welton, Duncan, OK (US); Jason E. Bryant, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 471 days.

(21) Appl. No.: 11/648,441

(22) Filed: Dec. 29, 2006

(65) Prior Publication Data

US 2008/0161207 A1 Jul. 3, 2008

(51) Int. Cl.
C09K 8/68 (2006.01)
C09K 8/524 (2006.01)
C09K 8/60 (2006.01)
C09K 8/64 (2006.01)
C09K 8/72 (2006.01)
E21B 43/26 (2006.01)

(52) U.S. Cl. ........ 507/209; 507/203; 507/239; 507/240; 507/265; 507/267; 507/277; 166/305.1

(58) Field of Classification Search .................. 507/209, 507/203, 239, 240, 265, 267, 277; 166/305.1
See application file for complete search history.

(56) References Cited

U.S. PATENT DOCUMENTS

| | | | |
|---|---|---|---|
| 3,333,634 A | 8/1967 | Townsend et al. | |
| 3,410,343 A | 11/1968 | Abdo | |
| 3,737,977 A | 6/1973 | Jorgensen | |
| 3,866,685 A | 2/1975 | Friedman | |
| 5,582,249 A | 12/1996 | Caveny et al. | 166/276 |
| 5,775,425 A | 7/1998 | Weaver et al. | 166/276 |
| 5,787,986 A | 8/1998 | Weaver et al. | 166/280.2 |
| 5,833,000 A | 11/1998 | Weaver et al. | 166/276 |
| 5,839,510 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,879,699 A | 3/1999 | Lerner | 424/440 |
| 5,897,699 A | 4/1999 | Chatterji et al. | 106/678 |
| 6,047,772 A | 4/2000 | Weaver et al. | 166/276 |
| 6,063,738 A | 5/2000 | Chatterji et al. | 507/269 |
| 6,209,643 B1 | 4/2001 | Nguyen et al. | 166/276 |
| 6,258,859 B1 * | 7/2001 | Dahayanake et al. | 516/77 |
| 6,419,017 B1 | 7/2002 | Metcalf et al. | |
| 6,439,309 B1 | 8/2002 | Matherly et al. | 166/276 |
| 6,547,871 B2 | 4/2003 | Chatterji et al. | 106/672 |
| 6,637,517 B2 | 10/2003 | Samuel et al. | |
| 6,881,709 B2 | 4/2005 | Nelson et al. | 507/203 |
| 7,159,659 B2 | 1/2007 | Welton et al. | |
| 7,299,874 B2 | 11/2007 | Welton et al. | |
| 7,303,019 B2 | 12/2007 | Welton et al. | |
| 7,373,977 B1 | 5/2008 | Berger et al. | |
| 2004/0176478 A1 | 9/2004 | Dahayanake et al. | |
| 2005/0059558 A1 * | 3/2005 | Blauch et al. | 507/203 |
| 2005/0092489 A1 | 5/2005 | Welton et al. | |
| 2005/0107265 A1 * | 5/2005 | Sullivan et al. | 507/271 |
| 2005/0274517 A1 | 12/2005 | Blauch et al. | |
| 2006/0063681 A1 | 3/2006 | Christanti et al. | |
| 2006/0180309 A1 | 8/2006 | Welton et al. | |
| 2006/0180310 A1 | 8/2006 | Welton et al. | |
| 2006/0183646 A1 | 8/2006 | Welton et al. | |
| 2006/0211775 A1 | 9/2006 | Crews | |
| 2006/0211776 A1 | 9/2006 | Crews | |
| 2007/0007010 A1 | 1/2007 | Welton et al. | |
| 2007/0213212 A1 | 9/2007 | Hartshorne et al. | |
| 2008/0011476 A1 | 1/2008 | Nguyen et al. | |
| 2008/0161210 A1 | 7/2008 | Welton et al. | |
| 2008/0161212 A1 | 7/2008 | Welton et al. | |
| 2009/0143256 A1 | 6/2009 | Welton et al. | |
| 2009/0305913 A1 | 12/2009 | Welton et al. | |

FOREIGN PATENT DOCUMENTS

GB 2406863 A 4/2005
WO WO2005040554 A1 5/2005

OTHER PUBLICATIONS

Office Action for U.S. Appl. No. 11/647,743, dated Jun. 11, 2009.
Office Action mailed Oct. 21, 2008, for U.S. Appl. No. 11/647,743.
U.S. Appl. No. 10/800,478, filed Mar. 15, 2004, Dahayanake et al.
U.S. Appl. No. 11/058,660, filed Feb. 15, 2005, Welton et al.
U.S. Appl. No. 11/058,475, filed Feb. 15, 2005, Welton et al.
U.S. Appl. No. 11/058,612, filed Feb. 15, 2005, Welton et al.
U.S. Appl. No. 11/058,611, filed Feb. 15, 2005, Welton et al.
Al-Ghamdi, AbdulWahab et al., "Impact of Acid Additives on the Rheological Properties of Viscoelastic Surfactants and Their Influence on Filed Application," Society of Petroleum Engineers, SPE 89418, Apr. 17, 2004.
Notice of Allowance and Notice of Allowability for U.S. Appl. No. 11/648,019 dated Sep. 9, 2009.
Notice of Allowance and Notice of Allowability for U.S. Appl. No. 11/648,019 dated Dec. 30, 2009.
International Search Report and Written Opinion for PCT/GB2007/004710 dated Oct. 13, 2008.
Schlumberger Article, ClearFRAC CO2 Surfactant, Apr. 2005.
Schlumberger Article, ClearFRAC EF Surfactant, Apr. 2005.
Schlumberger Article, ClearFRAC HiPerm Polymer-Free Fracturing Fluid for High-Permeability Reservoirs, Aug. 2005.
Schlumberger Article, ClearFRAC HT Surfactant, Apr. 2005.
Schlumberger Article, ClearFRAC Polymer-Free Fracturing Fluid, Apr. 2005.
Schlumberger Article, ClearFRAC Polymer-Free Fracturing Fluids, Apr. 2005.
Schlumberger Article, ClearPAC A Polymer-Free Gravel-Packing Fluid Family for Higher Productivity, May 2005.
Schlumberger Article, ClearPAC MS Polymer-Free Fluid for Simultaneous Gravel Packing and Mudcake Cleanup, May 2005.

(Continued)

Primary Examiner — Timothy J. Kugel
Assistant Examiner — Atnaf Admasu
(74) Attorney, Agent, or Firm — Robert A. Kent; McDermott Will & Emery LLP

(57) ABSTRACT

Among many things, in some embodiments, improved viscoelastic surfactant gels that comprise non-aqueous tackifying agents, and their associated methods of use, are provided. In one embodiment, the methods comprise: providing a treatment fluid that comprises an aqueous base fluid, a non-aqueous tackifying agent, and a viscoelastic surfactant; and introducing the treatment fluid into a subterranean formation.

12 Claims, 1 Drawing Sheet

OTHER PUBLICATIONS

Schlumberger Article, ClearPAC LT Polymer-Free Fluid for Low-Temperature Gravel Pack, May 2005.
Schlumberger Article, ClearPAC HD Polymer-Free Fluid for High-Density Gravel Pack, May 2005.
Schlumberger Article, VDA Viscoelastic Diverting Acid, Aug. 2002.
Office Action for U.S. Appl. No. 11/647,743 dated Jan. 28, 2010.
Notice of Allowance and Notice of Allowability for U.S. Appl. No. 11/647,605 dated Dec. 28, 2009.
Notice of Allowance and Notice of Allowability from U.S. Appl. No. 11/647,605 dated Feb. 18, 2010.
Notice of Allowance and Notice of Allowability from U.S. Appl. No. 11/648,019 dated Feb. 24, 2010.
Notice of Allowance and Notice of Allowability for U.S. Appl. No. 11/647,605, dated Sep. 2, 2009.
Notice of Allowance and Notice of Allowability for U.S. Appl. No. 11/648,019, dated Sep. 9, 2009.
Office Action for U.S. Appl. No. 12/322,000 dated Feb. 7, 2011.
Office Action for U.S. Appl. No. 11/647,743 dated Nov. 30, 2010.

* cited by examiner

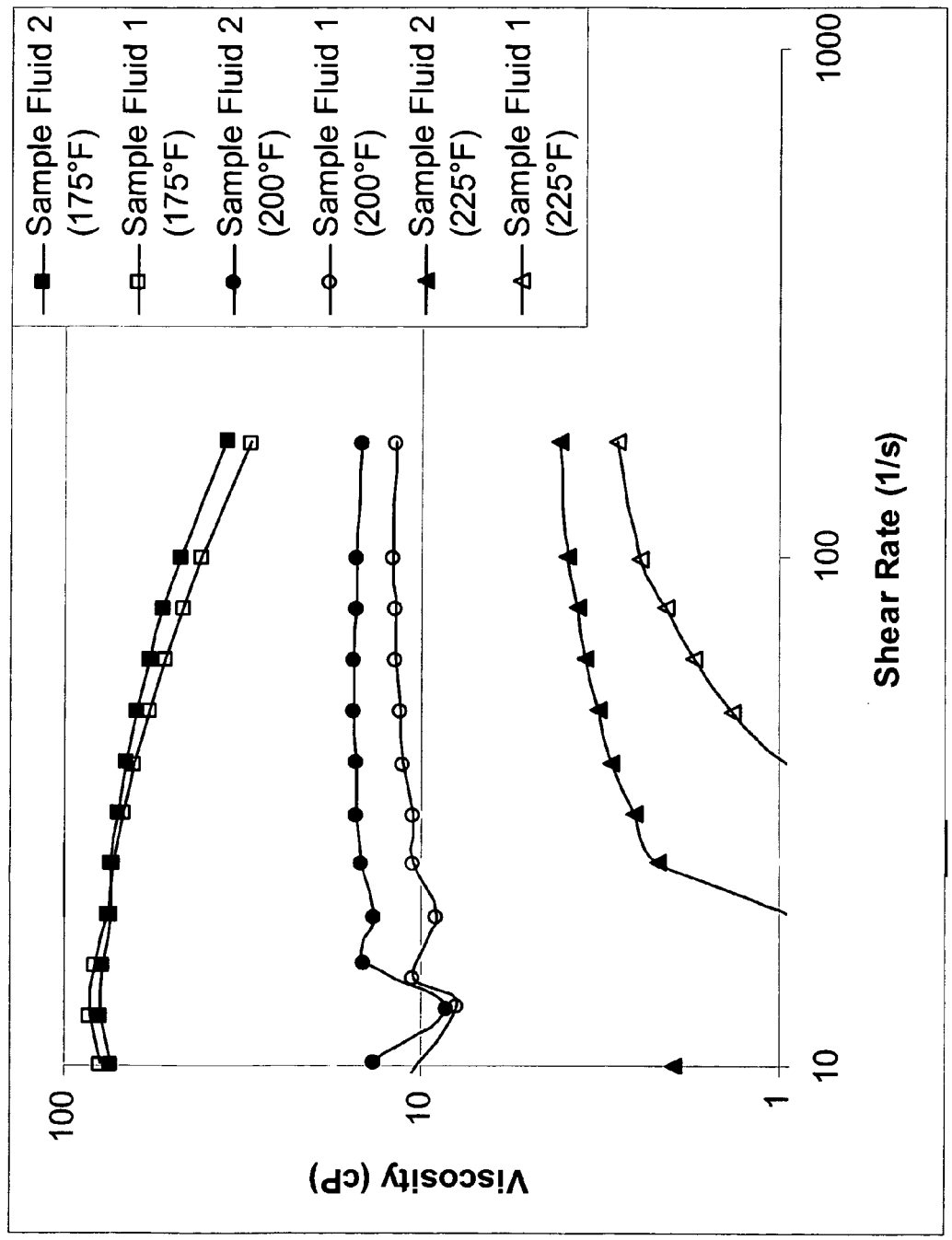

SUBTERRANEAN TREATMENT FLUIDS COMPRISING VISCOELASTIC SURFACTANT GELS

CROSS-REFERENCE TO RELATED APPLICATIONS

The present invention is related to co-pending U.S. application Ser. No. 11/647,743 entitled "Improved Subterranean Treatment Fluids Comprising Viscoelastic Surfactant Gels," filed concurrently herewith, the entire disclosure of which is incorporated herein by reference.

BACKGROUND

The present invention relates to fluids useful in subterranean operations, and more particularly, to improved viscoelastic surfactant gels suitable for use in certain subterranean applications that comprise non-aqueous tackifying agents, and their associated methods of use.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluid may comprise particulates, often referred to as "proppant particulates," that are deposited in the fractures. The proppant particulates, inter alia, may prevent the fractures from fully closing upon the release of hydraulic pressure, forming conductive channels through which fluids may flow to the well bore. The proppant particulates also may be coated with certain types of materials, including resins, tackifying agents, and the like, among other purposes, to enhance conductivity (e.g., fluid flow) through the fractures in which they reside. Once at least one fracture is created and the proppant particulates are substantially in place, the treatment fluid may be "broken" (i.e., the viscosity of the fluid is reduced), and the treatment fluid may be recovered from the formation.

Other common production stimulation operations that employ treatment fluids are acidizing operations. Where the subterranean formation comprises acid-soluble components, such as those present in carbonate and sandstone formations, stimulation is often achieved by contacting the formation with a treatment fluid that comprises an acid. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface (e.g., "flowing back" the well), leaving a desirable amount of voids (e.g., wormholes) within the formation, which may enhance the formation's permeability and/or increase the rate at which hydrocarbons subsequently may be produced from the formation. One method of acidizing known as "fracture acidizing" comprises injecting a treatment fluid that comprises an acid into the formation at a pressure sufficient to create or enhance one or more fractures within the subterranean formation. Another method of acidizing known as "matrix acidizing" comprises injecting a treatment fluid that comprises an acid into the formation at a pressure below that which would create or enhance one or more fractures within the subterranean formation.

Treatment fluids are also utilized in sand control treatments, such as gravel packing. In "gravel-packing" treatments, a treatment fluid suspends particulates (commonly referred to as "gravel particulates"), and deposits at least a portion of those particulates in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. The gravel particulates also may be coated with certain types of materials, including resins, tackifying agents, and the like, among other purposes, to enhance conductivity (e.g., fluid flow) through the gravel pack in which they reside. Once the gravel pack is substantially in place, the viscosity of the treatment fluid may be reduced to allow it to be recovered. In some situations, fracturing and gravel-packing treatments are combined into a single treatment (commonly referred to as "FracPaC™" operations). In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in the treatment fluids used in these operations is important for a number of reasons. Maintaining sufficient viscosity is important in fracturing and sand control treatments for particulate transport and/or to create or enhance fracture width. Also, maintaining sufficient viscosity may be important to control and/or reduce fluid loss into the formation. At the same time, while maintaining sufficient viscosity of the treatment fluid often is desirable, it may also be desirable to maintain the viscosity of the treatment fluid in such a way that the viscosity also may be reduced easily at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to, guar gums and derivatives thereof, cellulose derivatives, biopolymers, and the like. To further increase the viscosity of a treatment fluid, often the polymeric gelling agent is crosslinked with the use of a crosslinking agent. Conventional crosslinking agents may comprise a borate ion, a metal ion, or the like, and interact with at least two gelling agent molecules to form a crosslink between them, thereby forming a "crosslinked gelling agent." Treatment fluids comprising crosslinked gelling agents also may exhibit elastic and/or viscoelastic properties, wherein the crosslinks between gelling agent molecules may be broken and reformed, allowing the viscosity of the fluid to vary with certain conditions such as temperature, pH, and the like.

The use of polymeric gelling agents, however, may be problematic. For instance, polymeric gelling agents may leave an undesirable gel residue in the subterranean formation after use, which can impact permeability. As a result, costly remedial operations may be required to clean up the fracture face and proppant pack. Foamed treatment fluids and emulsion-based treatment fluids have been employed to minimize residual damage, but increased expense and complexity often have resulted.

To combat perceived problems associated with polymeric gelling agents, some surfactants have been used as gelling agents. It is well understood that, when mixed with a fluid in a concentration above the critical micelle concentration, the molecules (or ions) of surfactants may associate to form micelles. The term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wettability of a surface, solubilize certain materials, and/or reduce surface tension.

When used as a gelling agent, the molecules (or ions) of the surfactants associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein. As used herein, the term "viscoelastic surfactant" refers to surfactants that impart or are capable of imparting viscoelastic behavior to a fluid due, at least in part, to the association of surfactant molecules to form viscosifying micelles. Moreover, because the viscosifying micelles may be sensitive to hydrocarbons, the viscosity of these surfactant fluids may be reduced after introduction into the subterranean formation without the need for certain types of gel breakers (e.g., oxidizers). The term "breaker" is defined herein to include any substance that is capable of decreasing the viscosity of a fluid. This may allow a substantial portion of the surfactant fluids to be produced back from the formation without the need for expensive remedial treatments.

However, the use of treatment fluids viscosified with conventional polymeric and viscoelastic surfactant gelling agents may be problematic in certain subterranean formations exhibiting high temperatures (e.g., above about 200° F.). Many conventional gelling agents become unstable at these temperatures, which reduces the viscosity of the treatment fluid. Moreover, the stability of viscosifying micelles in viscoelastic surfactant gels may be extremely sensitive to various conditions (e.g., temperature, pH, presence of other additives in the fluid, composition of the subterranean formation, etc.), and thus the inclusion of other additives in the treatment fluid that are needed for a given treatment using that fluid may detrimentally affect the rheological properties (e.g., viscosity) of the fluid. Generally, the introduction of additional components (e.g., resin-coated proppants) into viscoelastic surfactant gels is thought to reduce the viscosity of those gels. The inability to maintain a desired level of viscosity, among other problems, may increase fluid loss and decrease the ability of the fluid to suspend and/or transport particulate materials.

SUMMARY

The present invention relates to fluids useful in subterranean operations, and more particularly, to improved viscoelastic surfactant gels suitable for use in certain subterranean applications that comprise non-aqueous tackifying agents, and their associated methods of use.

In one embodiment, the present invention provides a synergistic viscosification additive comprising a non-aqueous tackifying agent and a viscoelastic surfactant.

In another embodiment, the present invention provides a treatment fluid comprising an aqueous base fluid, a non-aqueous tackifying agent, and a viscoelastic surfactant.

In another embodiment, the present invention provides a synergistic viscosification additive system for viscosifying a treatment fluid comprising: a particulate wherein a non-aqueous tackifying agent is present on a surface of the particulate; and a viscoelastic surfactant.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

FIG. 1 illustrates some data regarding the viscosity of various treatment fluids, including certain embodiments of the treatment fluids of the present invention.

DESCRIPTION OF PREFERRED EMBODIMENTS

The present invention relates to fluids useful in subterranean operations, and more particularly, to improved viscoelastic surfactant gels suitable for use in certain subterranean applications that comprise non-aqueous tackifying agents, and their associated methods of use.

The treatment fluids and synergistic viscosification additives of the present invention generally comprise a non-aqueous tackifying agent and a viscoelastic surfactant. As used herein, the term "viscoelastic surfactant" refers to surfactants that impart or are capable of imparting viscoelastic behavior to a fluid due, at least in part, to the association of surfactant molecules to form viscosifying micelles. As used herein, the term "viscosifying micelle" includes structures that minimize the contact between the lyophobic ("solvent-repelling") portion of a surfactant molecule and the solvent that, under certain conditions (e.g., concentration, ionic strength of the fluid, etc.) are capable of, inter alia, imparting increased viscosity to a particular fluid and/or forming a gel. In certain embodiments, the methods and treatment fluids of the present invention, among other things, may permit the use or incorporation of non-aqueous tackifying agents, for example, to enhance the conductivity of propped fractures and/or gravel packs, without adversely affecting the rheological properties (e.g., viscosity) of a viscoelastic surfactant fluid used in those treatments. For example, the methods and treatment fluids of the present invention, may permit the use or incorporation of non-aqueous tackifying agents, for example, to enhance the conductivity of propped fractures and/or gravel packs, in the same treatment as a treatment fluid that comprises a viscoelastic surfactant without substantially decreasing the viscosity of the treatment fluid. As used herein, a "substantial decrease in the viscosity" of a treatment fluid (and derivatives of that phrase) refers to a reduction in the viscosity of the treatment fluid to below about 20 cP, for example, as measured using any rheometer or viscometer known in the art while applying shear to the fluid at a rate of about $100 \, s^{-1}$.

In certain embodiments, the non-aqueous tackifying agent and the viscoelastic surfactant may interact with each other and/or with other components of a treatment fluid in a manner that appears to synergistically enhance the rheological properties (e.g., viscosity, temperature stability) of a treatment fluid to which these additives may be added. The treatment fluids and synergistic viscosification additives of the present invention may exhibit and/or impart, among other things, enhanced rheological and/or viscoelastic properties as compared to fluids and gels comprising conventional polymeric and surfactant gelling agents. In certain embodiments, the treatment fluids of the present invention may exhibit a viscosity that is at least 50% greater than the viscosity of a treatment fluid or gel that comprises a conventional viscoelastic surfactant gelling agent. For example, the treatment fluids of the present invention may exhibit increased viscosity at high temperatures (e.g., above about 200° F., or in some cases, above about 225° F.), as compared to conventional treatment fluids and/or gels.

The non-aqueous tackifying agents in the treatment fluids and synergistic viscosification additives of the present invention generally may comprise any non-aqueous tackifying agent known in the art. One group of these non-aqueous tackifying agents comprise polyamides that are liquids or in solution at the temperature of the subterranean formation such that they are, by themselves, non-hardening when introduced into the subterranean formation. An example of such a product is a condensation reaction product comprised of commercially available polyacids and a polyamine. Such commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying compounds include liquids and solutions of, for example, polyesters, polycarbonates and polycarbamates, natural resins such as shellac and the like. Other suitable non-aqueous tackifying agents are described in U.S. Pat. No. 5,853,048 issued to Weaver, et al., U.S. Pat. No. 5,833,000 issued to Weaver, et al., U.S. Pat. No. 5,582,249 issued to Weaver, et al., U.S. Pat. No. 5,775,425 issued to Weaver, et al., and U.S. Pat. No. 5,787,986 issued to Weaver, et al., the relevant disclosures of which are herein incorporated by reference.

Other non-aqueous tackifying agents that may be used in the present invention may comprise silyl-modified polyamide compounds. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309 issued to Matherly et al., the relevant disclosure of which is herein incorporated by reference.

In certain embodiments, the non-aqueous tackifying agent may be combined with a multifunctional material. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the non-aqueous tackifying agent in an amount of from about 0.01 to about 50 percent by weight of the non-aqueous tackifying agent. In some embodiments, the compound is present in an amount of from about 0.5 to about 1 percent by weight of the non-aqueous tackifying agent. Suitable multifunctional materials are described in U.S. Pat. Nos. 5,839,510; 5,775,425; 5,787,986; 5,833,000; 5,853,048; 5,871,049; 6,047,772; and 6,209,643, the relevant disclosures of which are herein incorporated by reference.

In certain embodiments, the non-aqueous tackifying agent may be combined with a solvent. Solvents suitable for use in the present invention include any solvent that is compatible with the non-aqueous tackifying agent and achieves the desired viscosity effect. The solvents that can be used in the present invention may include those having high flash points (e.g., above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

The non-aqueous tackifying agent may be provided in any form that is suitable for the particular treatment fluid and/or application of the present invention. In certain embodiments, the non-aqueous tackifying agent may be provided as a liquid and/or solid additive that is admixed or incorporated into a treatment fluid used in conjunction with the present invention. The non-aqueous tackifying agent may be provided and/or incorporated into a treatment fluid together with the viscoelastic surfactant (e.g., in the same additive or treatment fluid that comprises the viscoelastic surfactant), and/or it may be provided and/or incorporated into a treatment fluid as a separate additive. Where they are provided and/or incorporated into a treatment fluid separately, the non-aqueous tackifying agent and the viscoelastic surfactant may be provided and/or incorporated simultaneously, or the non-aqueous tackifying agent may be provided and/or incorporated at some point in time before or after the viscoelastic surfactant is provided and/or incorporated. In certain embodiments, the non-aqueous tackifying agent may be present on the surface of one or more particulates (e.g., proppant particulates, gravel particulates) that are included in a treatment fluid and/or that a treatment fluid interacts with in the course of a subterranean operation. For example, the non-aqueous tackifying agent may be provided as a coating or partial coating on one or more particulates. In certain embodiments, the non-aqueous tackifying agent may be provided as a coating on one or more particulates that reside in a portion of a subterranean formation, and a treatment fluid may be allowed to contact at least a plurality of those particulates such that the non-aqueous tackifying agent interacts with the treatment fluid, among other possible results, to enhance the rheological properties (e.g., the viscosity) of the treatment fluid.

The non-aqueous tackifying agent should be present in a treatment fluid or synergistic viscosification additive of the present invention in an amount sufficient to impart the desired viscosity (e.g., sufficient viscosity to divert flow, reduce fluid loss, suspend particulates, etc.) to a treatment fluid. In certain embodiments, the non-aqueous tackifying agent may be present in the treatment fluid in an amount in the range of from about 0.1% to about 20% by weight of the treatment fluid. In certain embodiments, the non-aqueous tackifying agent may be present in an amount in the range of from about 0.5% to about 5% by weight of the fluid. In certain embodiments, the non-aqueous tackifying agent may be present in an amount of about 2% by weight of the treatment fluid.

The viscoelastic surfactants in the synergistic viscosification additives of the present invention generally comprise any viscoelastic surfactant known in the art, or any combination thereof. As used herein, the term "viscoelastic surfactant" refers to surfactants that impart or are capable of imparting viscoelastic behavior to a fluid due, at least in part, to the association of surfactant molecules to form viscosifying micelles. These viscoelastic surfactants may be cationic, anionic, nonionic, amphoteric, or zwitterionic in nature. The viscoelastic surfactants may comprise any number of different compounds, including methyl ester sulfonates (e.g., as described in U.S. patent application Ser. Nos. 11/058,660, 11/058,475, 11/058,612, and 11/058,611 filed Feb. 15, 2005, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. The term "derivative" is defined herein any compound that is made from one of the listed compounds, for example, by replacing one atom in one of the listed compounds with another atom or group of atoms, ionizing one of the listed compounds, or creating a salt of one of the listed compounds.

Suitable viscoelastic surfactants may comprise mixtures of several different compounds, including but not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. Examples of suitable mixtures of an ethoxylated alcohol ether sulfate surfactant, an alkyl or alkene amidopropyl betaine surfactant, and an alkyl or alkene dimethylamine oxide surfactant are described in U.S. Pat. No. 6,063,738, the relevant disclosure of which is incorporated herein by reference. Examples of suitable aqueous solutions of an alpha-olefinic sulfonate surfactant and a betaine surfactant are described in U.S. Pat. No. 5,897,699, the relevant disclosure of which is incorporated herein by reference.

Examples of commercially-available viscoelastic surfactants suitable for use in the present invention may include, but are not limited to, Mirataine BET-O 30™ (an oleamidopropyl betaine surfactant available from Rhodia Inc., Cranbury, N.J.), Aromox APA-T (amine oxide surfactant available from Akzo Nobel Chemicals, Chicago, Ill.), Ethoquad O/12 PG (fatty amine ethoxylate quat surfactant available from Akzo Nobel Chemicals, Chicago, Ill.), Ethomeen T/12™ (a fatty amine ethoxylate surfactant available from Akzo Nobel Chemicals, Chicago, Ill.), Ethomeen S/12™ (a fatty amine ethoxylate surfactant available from Akzo Nobel Chemicals, Chicago, Ill.), and Rewoteric AM TEG™ (a tallow dihydroxyethyl betaine amphoteric surfactant available from Degussa Corp., Parsippany, N.J.).

The viscoelastic surfactant should be present in a treatment fluid or synergistic viscosification additive of the present invention in an amount sufficient to impart the desired viscosity (e.g., sufficient viscosity to divert flow, reduce fluid loss, suspend particulates, etc.) to the treatment fluid. In certain embodiments, the viscoelastic surfactant may be present in the treatment fluid in an amount in the range of from about 0.1% to about 20% by weight of the fluid. In certain embodiments, the viscoelastic surfactant may be present in an amount in the range of from about 1% to about 10% by weight of the fluid. In certain embodiments, the viscoelastic surfactant may be present in an amount of about 7% by weight of the fluid.

The aqueous base fluids used in the treatment fluids of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids of the present invention. In certain embodiments, the density of the aqueous base fluid can be adjusted, among other purposes, to provide additional particle transport and suspension in the treatment fluids of the present invention. In certain embodiments, the pH of the aqueous base fluid may be adjusted (e.g., by a buffer or other pH adjusting agent), among other purposes, to reduce the viscosity of the treatment fluid (e.g., activate a breaker or other additive). In these embodiments, the pH may be adjusted to a specific level, which may depend on, among other factors, the types of viscoelastic surfactants, gelling agents, acids, and other additives included in the treatment fluid. One of ordinary skill in the art, with the benefit of this disclosure, will recognize when such density and/or pH adjustments are appropriate.

The treatment fluids used in methods of the present invention optionally may comprise any number of additional additives, including, but not limited to, salts, soaps, co-surfactants, carboxylic acids, acids, fluid loss control additives, gas, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, will recognize the types of additives that may be included in the treatment fluids for a particular application.

For example, the treatment fluids of the present invention optionally may comprise one or more salts, among other purposes, to modify the rheological properties (e.g., viscosity) of the treatment fluid. The salts may be organic or inorganic. Examples of suitable organic salts include but are not limited to aromatic sulfonates and carboxylates (such as p-toluene sulfonate, naphthalene sulfonate), hydroxynaphthalene carboxylates, salicylate, phthalate, chlorobenzoic acid, salicylic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts, (such as sodium chloride, potassium chloride, and ammonium chloride), calcium chloride, calcium bromide, magnesium chloride and zinc halide salts. Examples of treatment fluids comprising salts suitable for use in the present invention are described in U.S. patent application Ser. No. 10/800,478, the relevant disclosure of which is incorporated herein by reference. Any combination of the salts listed above also may be included in the treatment fluids of the present invention.

The salt may be present in any amount that imparts the desired stability and/or other rheological properties to the treatment fluid of the present invention. In certain embodiments, the salt may be present in an amount in the range of from about 0.05% to about 30% by weight of the treatment fluid. In certain embodiments, the salt may be present in an amount in the range of from about 0.1% to about 10% by weight of the treatment fluid. In certain embodiments, the salt may be present in an amount of about 5% by weight of the treatment fluid. The type and amount of salts suitable in a particular application of the present invention may depend upon a variety of factors, such as the type of viscoelastic surfactant present in the treatment fluid, the composition of the aqueous-base fluid, the temperature of the fluid, and the like. A person of ordinary skill, with the benefit of this disclosure, will recognize when to include a salt in a particular application of the present invention, as well as the appropriate type and amount of salts to include.

The treatment fluids of the present invention also optionally may comprise one or more soaps, or substances that generate a soap when placed in solution (e.g., carboxylic acids). These soaps or substances that generate a soap when placed in solution are referred to herein as "soap components." Among other purposes, the soap component may stabilize the treatment fluid and enhance its rheological properties (e.g., increase viscosity of the fluid), especially at higher temperatures (e.g., greater than about 200° F.). The term "soap" is defined herein to include salts of fatty acids. Examples of soaps that may be suitable for use in the present invention include sodium stearate, potassium stearate, ammonium stearate, sodium oleate, potassium oleate, ammonium oleate, sodium laurate, potassium laurate, sodium myristate, potassium myristate, sodium ricinoleate, potassium ricinoleate, sodium palmitate, potassium palmitate, calcium caprylate, sodium caprylate, potassium caprylate, and the like. In certain embodiments where it is desirable to include a soap in a treatment fluid of the present invention, one or more free carboxylic acids of a soap (e.g., fatty acids) may be placed in solution to generate a soap. Examples of carboxylic acids that may be suitable for this use include, but are not limited to, 4,7,10,13,16,19-docosahexaenoic acid, 4,7,10,13,16-docosapentaenoic acid, 5,8,11,14,17-eicosapentaenoic acid, 5,8,11,14-eicosatetraenoic acid, 5,8,11-eicosatrienoic acid, 6,9,12,15-octadecatetraenoic acid, 7,10,13,16,19-docosapentaenoic acid, 7,10,13,16-docosatetraenoic acid, 8,11,14,17-eicosatetraenoic acid, 8,11,14-eicosatrienoic acid, behenic acid, capric acid, caprylic acid, cis-11-docosenoic acid, cis-11-eicosenoic acid, cis-11-octadecenoic acid, cis-15-tetracosenoic acid, cis-4-decenoic acid, cis-4-dodecenoic acid, cis-4-tetradecenoic acid, cis-5-lauroleic acid, cis-5-tetradecenoic acid, cis-6-octadecenoic acid, cis-9-decenoic acid, cis-9-dodecenoic acid, cis-9-eicosenoic acid, cis-9-hexadecenoic acid, cis-9-tetradecenoic, cis-tetracosenoic acid, caprylic acid decenoic acid, dihydroxystearic acid, docosadienoic acid, docosahexaenoic acid, docosapentaenoic acid, dotriacontanoic acid, eicosadienoic acid, eicosanoic acid, eicosapentaenoic acid, eicosatetraenoic acid, eicosatrienoic acid, eicosenoic acid, erucic acid, heptadecanoic acid, heptadecenoic acid, hexacosanoic acid, hexadecadienoic acid, hexadecenoic acid, lauric acid, linoleic acid, linolenic, myristic acid, nonadecanoic acid, nonanoic acid, octacosanoic acid, octadecatetraenoic acid, octadecatrienoic acid, oleic acid, palmitic acid, pentadecanoic acid, pentadecenoic acid, pentatriacontanoic, ricinoleic acid, stearic acid, tetracosanoic acid, tetradecenoic acid, tetratriacontanoic acid, triacontanoic acid, tridecanoic acid, tritriacontanoic acid, combinations thereof, and the like.

The soap component also may be combination of fatty acids made from numerous sources including but limited to animal fats, marine fats, vegetable oils and fats, butter, canola oil, castor oil, coco butter coconut oil, corn oil, cotton seed oil, crambe oil, herrings, lard, linseed oil, menhaden, olive oil, palm kernel oil, peanut oil, plam oil, rape seed oil, safflower oil, sardines, soybean oil, sunflower oil, tall oil, tallow, tung oil, yellow grease, combinations thereof, and the like. Any combination of the soaps or free fatty acids listed above also may be included in the treatment fluids of the present invention. The type and amount of soap components suitable in a particular application of the present invention may depend upon a variety of factors, such as the type of viscoelastic surfactant present in the treatment fluid, the composition of the aqueous-base fluid, the temperature of the fluid, and the like. For example, certain types of soap components may be incompatible with certain components of the treatment fluid and/or produce undesirable characteristics in the fluid (e.g., reduced viscosity and/or stability).

The soap component may be present in any amount that imparts the desired stability and/or other rheological properties to the treatment fluid of the present invention. In certain embodiments, the soap component may be present in the treatment fluid in an amount in the range of from about 0.01% to about 10% by weight of the fluid. In certain embodiments, the soap component may be present in an amount in the range of from about 0.05% to about 2% by weight of the fluid. In certain embodiments, the soap component may be present in an amount of about 0.14% by weight of the fluid. A person of ordinary skill, with the benefit of this disclosure, will recognize when to include a soap component in a particular application of the present invention, as well as the appropriate type and amount of soap component to include.

The synergistic viscosification additives and treatment fluids of the present invention and/or any component thereof (e.g., the non-aqueous tackifying agent) may be provided in any form that is suitable for the particular treatment fluid and/or application of the present invention. In certain embodiments, the synergistic viscosification additives of the present invention may be provided as a liquid and/or solid additive that is admixed or incorporated into a treatment fluid used in conjunction with the present invention. The different components of the synergistic viscosification additives of the present invention may be provided and/or incorporated into a treatment fluid together (e.g., in the same additive or treatment fluid), and/or they may be provided and/or incorporated into a treatment fluid as separate additives. Where they are provided and/or incorporated into a treatment fluid separately, the different components may be provided and/or incorporated simultaneously, or certain components may be provided and/or incorporated at some point in time before or after the other components are provided and/or incorporated. In certain embodiments, the synergistic viscosification additives of the present invention may be present on the surface of one or more particulates (e.g., proppant particulates, gravel particulates) that are included in a treatment fluid and/or that a treatment fluid interacts with in the course of a subterranean operation. For example, the synergistic viscosification additives of the present invention may be provided as a coating or partial coating on the particulates. For example, the synergistic viscosification additives of the present invention may be provided as a coating on one or more particulates that reside in a portion of a subterranean formation, and a treatment fluid may be allowed to contact at least a plurality of those particulates such that the synergistic viscosification additives interact with the treatment fluid, among other possible results, to enhance the rheological properties (e.g., viscosity) of the treatment fluid.

The synergistic viscosification additives and treatment fluids of the present invention and/or any component thereof may be prepared at a job site, or they may be prepared at a plant or facility prior to use, and may be stored for some period of time prior to use. In certain embodiments, the preparation of these synergistic viscosification additives and treatment fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

The methods and treatment fluids of the present invention may be used during or in preparation for any subterranean operation wherein a fluid may be used. Suitable subterranean operations may include, but are not limited to, drilling operations, hydraulic fracturing treatments, sand control treatments (e.g., gravel packing), acidizing treatments (e.g., matrix acidizing or fracture acidizing), "frac-pack" treatments, well bore clean-out treatments, and other suitable operations where a treatment fluid of the present invention may be useful. In one embodiment, the present invention provides a method that comprises: providing a treatment fluid that comprises an aqueous base fluid, a non-aqueous tackifying agent, and a viscoelastic surfactant; and introducing the treatment fluid into a subterranean formation. In certain embodiments, the treatment fluid may be introduced into the subterranean formation at or above a pressures sufficient to create or enhance at least one fracture in the subterranean formation. In certain embodiments, the treatment fluid may comprise a plurality of gravel particulates, and the methods may further comprise depositing at least a portion of those particulates in a desired area in a well bore, e.g., to form a gravel pack, provide some degree of sand control in the subterranean formation, and/or prevent the flow of particulates from an unconsolidated portion of the subterranean formation (e.g., a propped fracture) into a well bore.

The methods of the present invention also may be used, inter alia, to maintain the viscosity of a treatment fluid that comprises a viscoelastic surfactant. In one embodiment, the present invention provides a method of maintaining the viscosity of a treatment fluid, the method comprising: providing a treatment fluid that comprises an aqueous base fluid and a viscoelastic surfactant fluid, wherein the treatment fluid has a first viscosity; providing a non-aqueous tackifying agent; and contacting the treatment fluid with the non-aqueous tackifying agent, whereby the viscosity of the treatment fluid does not substantially decrease from the first viscosity. These methods of the present invention may be performed prior to and/or in the course of performing any subterranean operation where the treatment fluid may be used, including any of the subterranean operations discussed above. These methods of the present invention (or any portion thereof) may be performed at the job site just prior to using the treatment fluid, or they may be performed ahead of time (i.e., at a plant or facility) and the treatment fluid may be stored for some period of time prior to use. In certain embodiments, these methods of the present invention may be performed at the job site in a method characterized as being performed "on the fly" or in "real-time" mixing.

In some embodiments, the methods of the present invention may be used to maintain the viscosity of a treatment fluid while or after it is placed in a subterranean formation. For example, in some embodiments, the methods of the present invention may be used to treat a subterranean formation wherein particulates that have a non-aqueous tackifying agent on their surface (e.g., proppant particulates coated with a non-aqueous tackifying agent) reside in a portion of the subterranean formation. A treatment fluid comprising an aqueous base fluid and a viscoelastic surfactant fluid may be introduced into that portion of the subterranean formation and the treatment fluid may be allowed to contact the non-aqueous tackifying agent on the surface of those particulates. The viscosity of the treatment fluid may remain substantially constant for some portion of the time (or, in some cases, for the entire time) that the treatment fluid is in contact with the non-aqueous tackifying agent on the surface of the particulates.

The methods of the present invention also may be used, inter alia, to viscosify a treatment fluid that comprises a viscoelastic surfactant. In one embodiment, the present invention provides a method of viscosifying a treatment fluid comprising: providing a treatment fluid that comprises an aqueous base fluid and a viscoelastic surfactant, wherein the treatment fluid has a first viscosity; providing a non-aqueous tackifying agent; contacting the treatment fluid with the non-aqueous tackifying agent; and allowing the viscosity of the treatment fluid to increase to a second viscosity that is greater than the first viscosity. These methods of the present invention may be performed prior to and/or in the course of performing any subterranean operation where the viscosified treatment fluid may be used, including any of the subterranean operations discussed above. These methods of the present invention (or any portion thereof) may be performed at the job site just prior to using the treatment fluid, or they may be performed ahead of time (i.e., at a plant or facility) and the viscosified treatment fluid may be stored for some period of time prior to use. In certain embodiments, these methods of the present invention may be performed at the job site in a method characterized as being performed "on the fly" or in "real-time" mixing.

In some embodiments, the methods of the present invention may be used to viscosify a treatment fluid once it is placed in a subterranean formation. For example, in some embodiments, the methods of the present invention may be used to treat a subterranean formation wherein particulates that have a non-aqueous tackifying agent on their surface (e.g., proppant particulates coated with a non-aqueous tackifying agent) reside in a portion of the subterranean formation. A treatment fluid comprising an aqueous base fluid and a viscoelastic surfactant fluid may be introduced into that portion of the subterranean formation and the treatment fluid may be allowed to contact the non-aqueous tackifying agent on the surface of those particulates. Thus, the viscosity of the treatment fluid may increase once it comes into contact with the non-aqueous tackifying agent on the particulates in the subterranean formation.

To facilitate a better understanding of the present invention, the following examples of certain aspects of some embodiments are given. In no way should the following examples be read to limit, or define, the scope of the invention.

EXAMPLES

Example 1

A fluid sample was prepared by placing 400 mL of water in a Waring blender, and adding 30 mL Mirataine BET-O 30™ (an oleamidopropyl betaine surfactant available from Rhodia Inc., Cranbury, N.J.), 20 g sodium chloride, and 0.5 g potassium stearate. The apparent viscosity of this fluid was measured on a Fanny® 35A model viscometer with a standard bob and sleeve using a #1 spring at 300 rpm (511 $s^{-1}$). The viscosity of the fluid sample was measured to be 36 cP.

To the same fluid sample was added 100 g of 20/40 Ottawa sand that had been treated with 2 mL of Sandwedge® NT (a non-aqueous tackifying agent commercially available from Halliburton Energy Services, Inc. of Duncan, Okla.). The fluid was mixed, and then the sand was separated from the remainder of the fluid. The apparent viscosity of the sand-free portion of the fluid was measured on the same Fann® 35A model viscometer at the same conditions as above. The viscosity of the fluid sample was measured to be 56 cP.

Thus, Example 1 illustrates that the treatment fluids of the present invention may exhibit, among other things, enhanced rheological properties as compared to viscoelastic surfactant fluids or gels known in the art.

Example 2

Samples of two treatment fluids of the following compositions were prepared: Sample Fluid 1 contained 7% by weight Mirataine BET-O 30™ (an oleamidopropyl betaine surfactant available from Rhodia Inc., Cranbury, N.J.), and 0.14% by weight potassium stearate in water; and Sample Fluid 2 (a treatment fluid of the present invention contained 7% by weight Mirataine BET-O 30™, 0.14% by weight potassium stearate, and 2% by weight of Sandwedge® NT (a non-aqueous tackifying agent commercially available from Halliburton Energy Services, Inc. of Duncan, Okla.) in water.

The steady shear viscosities of these fluid samples were measured using a Stresstech rheometer (available from Rheologica Instruments, Lund, Sweden) with a cylindrical couette fixture. Steady shear viscosities of each of the fluid samples were performed at 175° F., 200° F., and 225° F. The data from the steady shear viscosity sweeps are provided in FIG. 1. In addition, table 1 below also lists the viscosity measurements at shear rates of 100 $s^{-1}$ and 170 $s^{-1}$ for each of the fluid samples at all three temperatures.

| Temperature (° F.) | Shear rate ($s^{-1}$) | Viscosity of Sample Fluid 1 (cP) | Viscosity of Sample Fluid 2 (cP) | Viscosity Increase from Sample Fluid 1 to Sample Fluid 2 |
|---|---|---|---|---|
| 175 | 170 | 30 | 35 | 17% |
| 175 | 100 | 41 | 47 | 14% |
| 200 | 170 | 12 | 15 | 24% |
| 200 | 100 | 12 | 15 | 26% |
| 225 | 170 | 3 | 4 | 45% |
| 225 | 100 | 2 | 4 | 62% |

Thus, Example 2 illustrates that the treatment fluids of the present invention may exhibit, among other things, enhanced rheological properties as compared to viscoelastic surfactant fluids or gels known in the art, especially at higher temperatures.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A treatment fluid comprising an aqueous base fluid, a non-aqueous tackifying agent, and a viscoelastic surfactant wherein the viscosity of the treatment fluid is above about 20 cP at 100 $s^{-1}$ at about 200° F. and further comprising an inorganic salt selected from the group consisting of a water-soluble potassium salt, a water-soluble sodium salt, a water-soluble ammonium salt, calcium chloride, calcium bromide, magnesium chloride, or a zinc halide salt.

2. The treatment fluid of claim 1 wherein the viscoelastic surfactant is selected from the group consisting of betaines, modified betaines, alkylamidobetaines, derivatives thereof, and combinations thereof.

3. The treatment fluid of claim 1 further comprising a soap component selected from the group consisting of: sodium stearate; potassium stearate; ammonium stearate; sodium oleate; potassium oleate; ammonium oleate; sodium laurate; potassium laurate; sodium myristate; potassium myristate;

sodium ricinoleate; potassium ricinoleate; sodium palmitate; potassium palmitate; calcium caprylate; sodium caprylate; potassium caprylate; a free carboxylic acid of a soap; 4,7,10, 13,16,19-docosahexaenoic acid; 4,7,10,13,16-docosapentaenoic acid; 5,8,11,14,17-eicosapentaenoic acid; 5,8,11,14-eicosatetraenoic acid; 5,8,11-eicosatrienoic acid; 6,9,12,15-octadecatetraenoic acid; 7,10,13,16,19-docosapentaenoic acid; 7,10,13,16-docosatetraenoic acid; 8,11,14,17-eicosatetraenoic acid; 8,11,14-eicosatrienoic acid; behenic acid; capric acid; caprylic acid; cis-11-docosenoic acid; cis-11-eicosenoic acid; cis-11-octadecenoic acid; cis-15-tetracosenoic acid; cis-4-decenoic acid; cis-4-dodecenoic acid; cis-4-tetradecenoic acid; cis-5-1auroleic acid; cis-5-tetradecenioc acid; cis-6-octadecenoic acid; cis-9-decenoic acid; cis-9-dodecenoic acid; cis-9-eicosenoic acid; cis-9-hexadecenoic acid; cis-9-tetradecenoic; cis-tetracosenoic acid; caprylic acid; decenoic acid; dihydroxystearic acid; docosadienoic acid; docosahexaenoic acid; docosapentaenoic acid; dotriacontanoic acid; eicosadienoic acid; eicosanoic acid; eicosapentaenoic acid; eicosatetraenoic acid; eicosatrienoic acid; eicosenoic acid; erucic acid; heptadecanoic acid; heptadecenoic acid; hexacosanoic acid; hexadecadienoic acid; hexadecenoic acid; lauric acid; linoleic acid; linolenic; myristic acid; nonadecanoic acid; nonanoic acid; octacosanoic acid; octadecatetraenoic acid; octadecatrienoic acid; oleic acid; palmitic acid; pentadecanoic acid; pentadecenoic acid; pentatriacontanoic; ricinoleic acid; stearic acid; tetracosanoic acid; tetradecenoic acid; tetratriacontanoic acid; triacontanoic acid; tridecanoic acid; or tritriacontanoic acid.

4. The treatment fluid of claim 1 wherein the non-aqueous tackifying agent is present in an amount in the range of from about 0.1% to about 20% by weight of the treatment fluid.

5. The treatment fluid of claim 1 wherein the viscoelastic surfactant is present in an amount in the range of from about 0.1% to about 20% by weight of the treatment fluid.

6. The treatment fluid of claim 1 wherein:
the viscoelastic surfactant comprises an oleamidopropyl betaine surfactant and is present in the treatment fluid in an amount in the range of from about 1% to about 10% by weight of the treatment fluid;
the non-aqueous tackifying agent comprises one or more polyamides and is present in an amount in the range of from about 0.5% to about 5% by weight of the treatment fluid; and
the treatment fluid further comprises a soap component that comprises potassium stearate and is present in the treatment fluid in an amount in the range of from about 0.05% to about 2% by weight of the treatment fluid.

7. A treatment fluid comprising an aqueous base fluid, a non-aqueous tackifying agent, and a viscoelastic surfactant wherein the viscosity of the treatment fluid is above about 20 cP at 100 s$^{-1}$ at about 200° F. and further comprising a soap component selected from the group consisting of: sodium stearate; potassium stearate; ammonium stearate; sodium oleate; potassium oleate; ammonium oleate; sodium laurate; potassium laurate; sodium myristate; potassium myristate; sodium ricinoleate; potassium ricinoleate; sodium palmitate; potassium palmitate; calcium caprylate; sodium caprylate; potassium caprylate; a free carboxylic acid of a soap; 4,7,10, 13,16,19-docosahexaenoic acid; 4,7,10,13,16-docosapentaenoic acid; 5,8,11,14,17-eicosapentaenoic acid; 5,8,11,14-eicosatetraenoic acid; 5,8,11-eicosatrienoic acid; 6,9,12,15-octadecatetraenoic acid; 7,10,13,16,19-docosapentaenoic acid; 7,10,13,16-docosatetraenoic acid; 8,11,14,17-eicosatetraenoic acid; 8,11,14-eicosatrienoic acid; behenic acid; capric acid; caprylic acid; cis-11-docosenoic acid; cis-11-eicosenoic acid; cis-11-octadecenoic acid; cis-15-tetracosenoic acid; cis-4-decenoic acid; cis-4-dodecenoic acid; cis-4-tetradecenoic acid; cis-5-1 auroleic acid; cis-5-tetradecenioc acid; cis-6-octadecenoic acid; cis-9-decenoic acid; cis-9-dodecenoic acid; cis-9-eicosenoic acid; cis-9-hexadecenoic acid; cis-9-tetradecenoic; cis-tetracosenoic acid; caprylic acid; decenoic acid; dihydroxystearic acid; docosadienoic acid; docosahexaenoic acid; docosapentaenoic acid; dotriacontanoic acid; eicosadienoic acid; eicosanoic acid; eicosapentaenoic acid; eicosatetraenoic acid; eicosatrienoic acid; eicosenoic acid; erucic acid; heptadecanoic acid; heptadecenoic acid; hexacosanoic acid; hexadecadienoic acid; hexadecenoic acid; lauric acid; linoleic acid; linolenic; myristic acid; nonadecanoic acid; nonanoic acid; octacosanoic acid; octadecatetraenoic acid; octadecatrienoic acid; oleic acid; palmitic acid; pentadecanoic acid; pentadecenoic acid; pentatriacontanoic; ricinoleic acid; stearic acid; tetracosanoic acid; tetradecenoic acid; tetratriacontanoic acid; triacontanoic acid; tridecanoic acid; or tritriacontanoic acid.

8. The treatment fluid of claim 7 wherein the viscoelastic surfactant is selected from the group consisting of betaines, modified betaines, alkylamidobetaines, derivatives thereof, and combinations thereof.

9. The treatment fluid of claim 7 further comprising one or more salts.

10. The treatment fluid of claim 7 wherein the non-aqueous tackifying agent is present in an amount in the range of from about 0.1% to about 20% by weight of the treatment fluid.

11. The treatment fluid of claim 7 wherein the viscoelastic surfactant is present in an amount in the range of from about 0.1% to about 20% by weight of the treatment fluid.

12. The treatment fluid of claim 7 wherein:
the viscoelastic surfactant comprises an oleamidopropyl betaine surfactant and is present in the treatment fluid in an amount in the range of from about 1% to about 10% by weight of the treatment fluid;
the non-aqueous tackifying agent comprises one or more polyamides and is present in an amount in the range of from about 0.5% to about 5% by weight of the treatment fluid; and
the soap component comprises potassium stearate and is present in the treatment fluid in an amount in the range of from about 0.05% to about 2% by weight of the treatment fluid.

* * * * *